United States Patent [19]

Schroeder

[11] Patent Number: 4,646,625
[45] Date of Patent: Mar. 3, 1987

[54] SPRING WEDGE FOR VENT

[76] Inventor: Richard J. Schroeder, W209 N13524 Robin Hood Dr., Richfield, Wis. 53076

[21] Appl. No.: 780,446

[22] Filed: Sep. 26, 1985

[51] Int. Cl.⁴ .............................................. F24F 13/08
[52] U.S. Cl. .............................................. 98/1; 98/2; 98/40.24; 292/289
[58] Field of Search ...................... 98/2, 40.24, 40.26, 98/40.27, 40.28, 1; 292/258, 284, 343

[56] References Cited

U.S. PATENT DOCUMENTS

| | | | |
|---|---|---|---|
| 656,116 | 8/1900 | Hoffman | 292/343 |
| 700,324 | 5/1902 | Gray | 292/343 |
| 1,633,202 | 6/1927 | Williams | 292/343 |
| 1,833,773 | 11/1931 | Brooks | 292/343 |
| 2,378,490 | 6/1945 | Lyons | 292/343 |

Primary Examiner—Harold Joyce
Attorney, Agent, or Firm—Fuller, Puerner & Hohenfeldt

[57] ABSTRACT

A spring clip is sized to fit in the gap between the rotor and housing of an automobile ventilation duct to secure the louvers in a fixed position. Outturned handles on the spring clip facilitate manipulation.

1 Claim, 4 Drawing Figures

U.S. Patent   Mar. 3, 1987   4,646,625
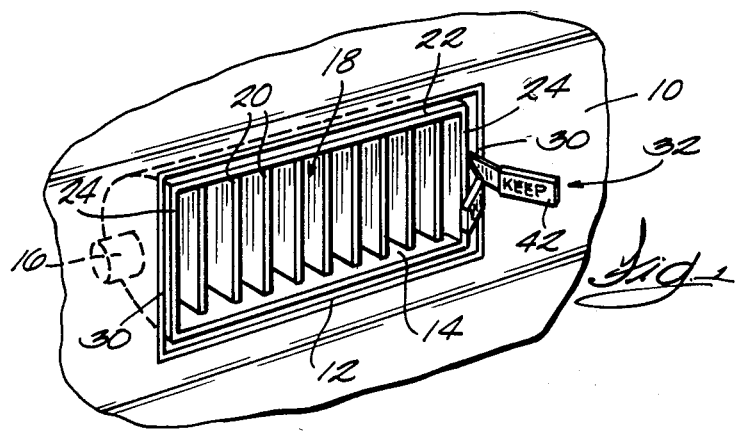
Fig. 1
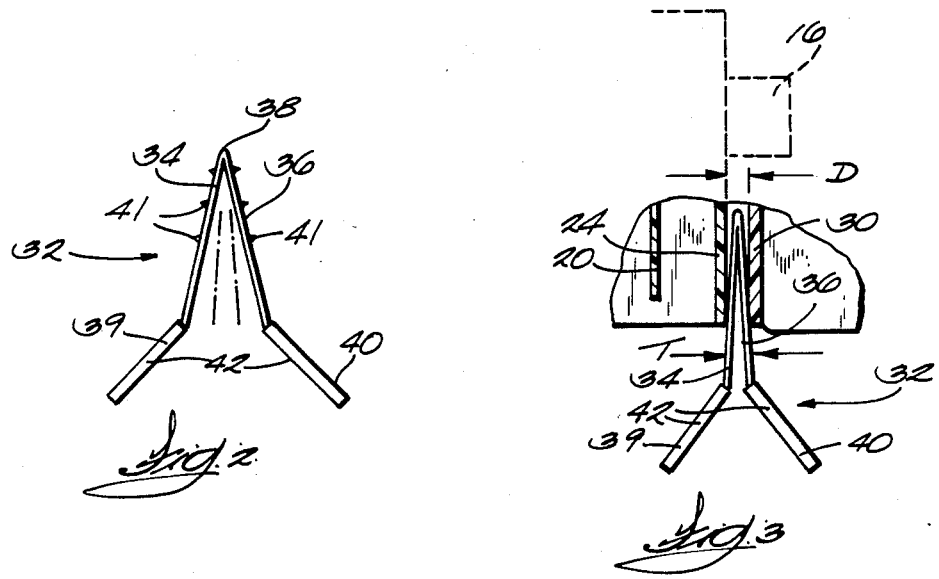
Fig. 2
Fig. 3
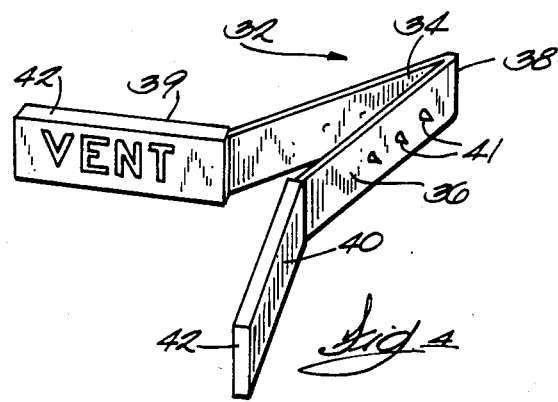
Fig. 4

SPRING WEDGE FOR VENT

BACKGROUND OF THE INVENTION

Ventilation vents in automobiles have air direction deflectors or louver blades on a rotor which are rotatable about a vertical or horizontal axis for discharge of air at selected angles. The individual baffles can also be adjusted to deflect the air at a certain angle relative to the horizontal axis. As a result of wear of the bearings and vibrations due to travel, the rotors shift from the selected position. There is no positive stop provided to fix the ventilation rotors at the selected angle and prevent displacement.

SUMMARY OF INVENTION

The invention provides a spring wedge which is sized to interfit between the end wall of the rotor and the end wall of the housing to positively position the rotor at the selected angle. Friction surfaces in the form of projections or teeth on the blades of the spring wedge grip the opposed walls of the housing and rotor. Outturned handle portions on the wedge facilitate manual manipulation.

Further objects, features and advantages of the invention will become apparent from the disclosure.

DESCRIPTION OF THE DRAWINGS

FIG. 1 is a perspective view of the spring wedge of the invention and is shown in place in an automobile vent between the vent rotor and vent housing.

FIG. 2 is an enlarged view of the spring wedge shown in FIG. 1.

FIG. 3 is an enlarged view similar to FIG. 2 showing the spring wedge in place.

FIG. 4 is an enlarged perspective view of the spring wedge of the invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 shows an automobile dashboard 10 with a ventilation outlet 12 having a rotor 14 which rotates about a horizontal axis 16. The rotor is provided with a louver assembly 18 which comprises a plurality of blades 20 which are commonly connected for common adjustment relative to an axis perpendicular to the axis 16. The rotor includes a rotor housing 22 with end walls 24 which are in close spaced relationship with housing end walls 30.

In accordance with the invention, a spring wedge 32 is provided which has first portions 34 and 36 which extend from a linear junction 38 and second portions 38 and 40 which diverge outwardly at a greater angle than the portions 34 and 36. The portions 38 and 40 may be provided with plastic caps 42 to facilitate manual gripping of the ends which form handle portions for manipulation of the portions 34 and 36. Portions 34 and 36 can also be provided with a friction surface 38 in order to engage the opposed walls 24 and 30 to keep the spring clip in place. The overall thickness T of the compressed blades at the friction surface is desirably such that it will provide a tight pressed fit in the gap D to firmly secure the rotor in place. The spring constant is selected to provide sufficient expansion pressure to maintain the friction surface in contact to prevent relative rotation between the rotor and the vent housing.

I claim:

1. A spring wedge adapted to secure a ventilation rotor at a selected position and adapted to interfit between the ventilation rotor and the ventilation housing, comprising opposed spring leaves having first portions extending from a linear junction, said first portions forming the wedge and second portions extending from a junction with the first portions and diverging outwardly to form a greater angle between said second portions than between said first portions to facilitate manual gripping thereof said second portions forming handle portions and wherein in said compressed state said spring wedge is sized to fit in the gap between the rotor and the wall in vent housing said spring wedge including projections on the outer surfaces of said first portions providing a friction surface and including plastic caps on said second spring portions to facilitate manipulation thereof.

* * * * *